UNITED STATES PATENT OFFICE 2,621,107

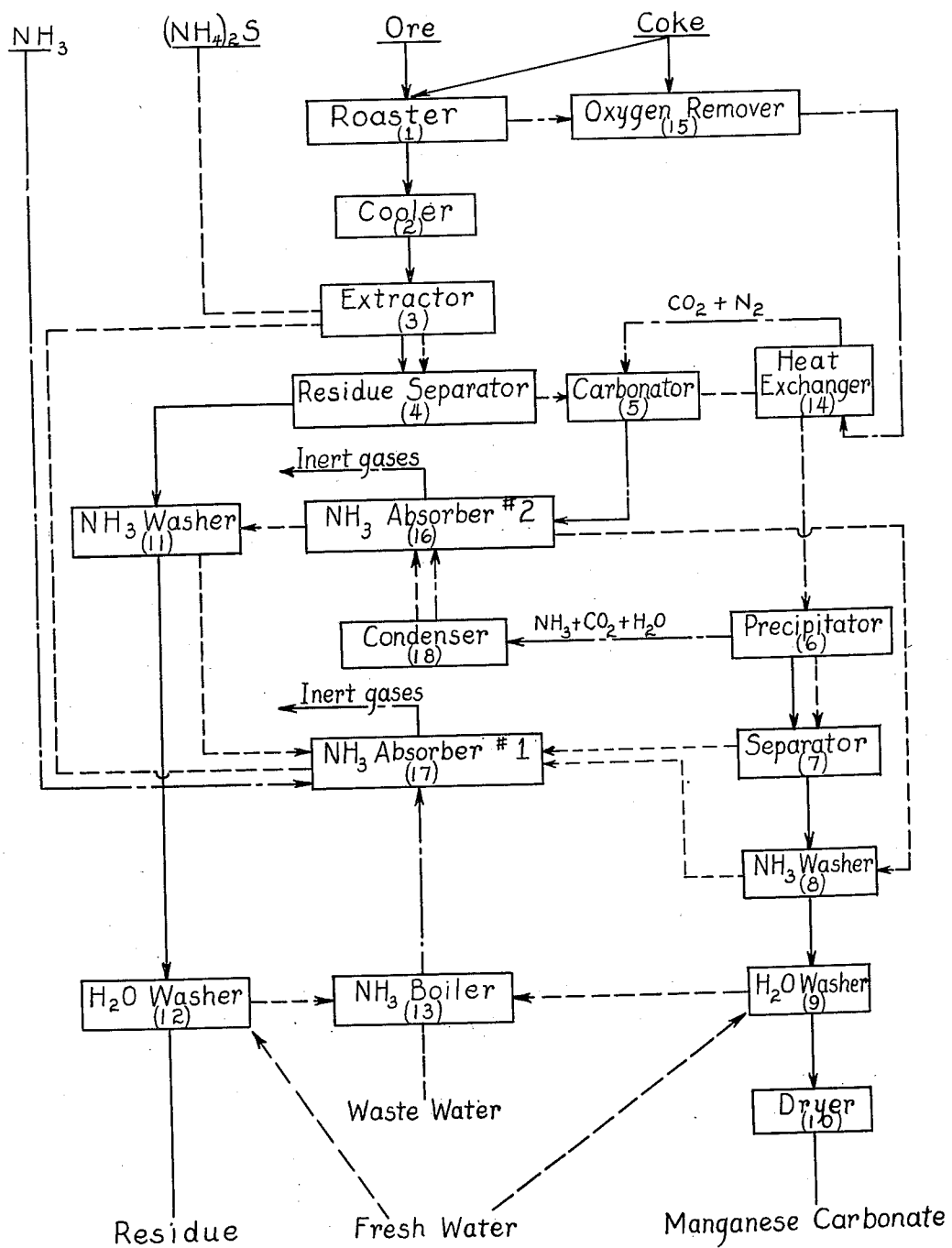

TREATMENT OF MANGANESE ORES FOR THE RECOVERY OF MANGANESE AS MANGANESE CARBONATE

Reginald S. Dean and Abraham L. Fox, Washington, D. C.; said Fox assignor to said Dean Application September 10, 1949, Serial No. 115,122

6 Claims. (Cl. 23—61)

This invention relates to processes for recovering manganese from its ores. It relates particularly to processes of dissolving manganous oxide in ammoniacal solutions to which carbon dioxide has been added and precipitating manganous carbonate from them. It has for its aim the improvement of such processes to make them more rapid and more efficient.

In co-pending applications each of us has disclosed processes for recovering manganese carbonate from ores. These co-pending applications are Serial No. 65,721, filed December 16, 1948, and Serial No. 57,376, filed October 29, 1948. The processes described in these applications disclose the following steps:

1. Converting the manganese content of the ore to manganous oxide.
2. Dissolving the manganous oxide in an aqueous solution made from 50–300 grams of $NH_3$ per liter and from 38.5–90.0 grams of $CO_2$ per liter, by agitation at atmospheric temperature for up to one hour, to produce a solution containing up to about 100 grams of manganese per liter as a complex salt.
3. Separating the solution from the residue of the ore.
4. Precipitating part or all of the manganese as carbonate from the solution by dilution with water, by removal of ammonia, by heating under pressure or a combination of these steps.
5. Separating the manganese carbonate from the solution.
6. Regenerating the solution for re-use in the second step by evaporation, adding $CO_2$, adding ammonia or by a combination of these.

The first, third and fifth steps are conventional and may be carried out by the usual methods of chemical engineering. Steps 2, 4 and 6 are disclosed in our co-pending applications. It is the particular aim of the present invention to improve these steps of the process.

We have found that certain addition agents substantially increase the rate of extraction and the total extraction of the manganese from the reduced ore when added in the leaching step. The addition agents which we have found effective are reducing agents and include hydroxylamine salts, ferrous salts, sulphites and sulphides.

Table I shows the effect of several reducing agents when used in a test leach containing 8 grams of well-reduced ore, 100 milliliters of aqua ammonia containing 28% $NH_3$ and 10 grams of commercial ammonium carbonate, shaking at a fixed rate in the absence of air.

In this application the composition of solutions will be referred to either in terms of the materials from which they are made, as has just been done for the tests reported in Table I, or in terms of the $NH_3$, $CO_2$ and $Mn$ which they contain. When the latter procedure is followed, it will be understood that these are components in the physico-chemical sense, that is, the solution being described could be arrived at by the reaction of the three components. No inference is intended as to the molecular species present in any given solution.

TABLE I

| Time of Leach, minutes | Accelerating agent | Mn extraction, percent |
|---|---|---|
| 15 | 17.5 mg. $NH_2OH.HSO_4$ | 81.5 |
| 30 | 17.5 mg. $NH_2OH.HSO_4$ | 83.4 |
| 15 | 1.0 gm. $Na_2SO_3$ | 46.0 |
| 15 | 0.25 gm. $Fe(NH_4)_2(SO_4)_2$ | 80.0 |
| 30 | 0.25 gm. $Fe(NH_4)_2(SO_4)_2$ | 89.0 |
| 15 | 1.0 gm. $Fe(NH_4)_2(SO_4)_2$ | 79.6 |
| 30 | 1.0 gm. $Fe(NH_4)_2(SO_4)_2$ | 89.0 |
| 15 | 10.0 ml. saturated $H_2SO_3$ | 52.5 |
| 15 | 250.0 mg. powdered iron | 41.5 |
| 15 | 100.0 mg. $Na_2S$ | 76.5 |
| 30 | 100.0 mg. $Na_2S$ | 70.0 |

These tests show that hydroxylamine salts, ferrous salts and soluble sulphides are significantly more effective than the other materials tried.

Further tests were made on hydroxylamine acid sulphate and on sodium sulphide to determine the effect of varying amounts of these additions and varying periods of agitation. The results are shown in Tables II and III.

TABLE II

*Hydroxylamine acid sulphate as addition agent*

[To determine minimum amounts of $NH_2OH.HSO_4$ required, and effect of time, 12 leaches were prepared each consisting of 8 gm. of well-reduced ore, 100 ml. of aqua ammonia, 10 gm. of ammonium carbonate and $NH_2OH.HSO_4$ as shown. The leaches were made on a shaking machine in sealed flasks.]

| Time, minutes | $NH_2OH.HSO_4$ mg. | Mn extraction, percent |
|---|---|---|
| 15 | 0 | 39.3 |
| 15 | 10 | 59.0 |
| 15 | 25 | 81.5 |
| 15 | 50 | 81.5 |
| 30 | 0 | 45.8 |
| 30 | 10 | 63.7 |
| 30 | 25 | 84.3 |
| 30 | 50 | 91.8 |
| 45 | 0 | 48.7 |
| 45 | 10 | 62.8 |
| 45 | 25 | 84.2 |
| 45 | 50 | 90.0 |

TABLE III

*Sodium sulphide as addition agent*

[Four grams of ore were treated with 100 ml. of aqua ammonia containing 10 gm. $(NH_4)_2CO_3$, the leach being made on the shaking machine for 30 minutes in sealed flasks.]

| Test No. | $Na_2S$, mg. | Mn extraction, percent |
|---|---|---|
| 1 | 10 | 98.5 |
| 2 | 50 | 96.5 |

In view of the cost of hydroxylamine and the fact that sodium sulphide also serves to precipitate certain impurities, further tests on sulphides were initiated. It was found that the use of sodium sulphide brought about the inclusion of sodium in the precipitated manganese carbonate, consequently ammonium sulphide was used. The results of tests with ammonium sulphide as an accelerating agent are shown in Table IV.

TABLE IV

[In these tests enough $CO_2$ was added to produce a concentration of 3.7 mols/liter, and the weight of ore used was 146 g./liter in each test. The ammonium sulphide solution contained 15% sulphur by weight. The maximum manganese concentration obtained, 83 grams per liter, corresponded to 85% extraction of the manganese.]

| Ammonium sulphide solution, cc./liter | $NH_3$ concentration, mols/liter | Mn content of pregnant liquor, g./liter | | | | |
|---|---|---|---|---|---|---|
| | | 5' | 10' | 15' | 20' | 30' |
| 2 | 16.2 | 63 | 72 | 73 | 73 | |
| 2 | 17.0 | 58 | 68 | 73 | 75 | |
| 4 | 16.2 | 75 | 77 | 75 | 72 | |
| 4 | 17.0 | 72 | 77 | | 79 | |
| 8 | 16.2 | 72 | 81 | 81 | 83 | 79 |
| 12 | 16.2 | | 83 | | | |
| 16 | 16.2 | | 81 | | | |
| 20 | 16.2 | | 72 | | | |
| 30 | 16.2 | | 77 | | | |

It will be seen that with 4 cc. of ammonium sulphide as accelerator a concentration of 72-75 grams per liter of manganese is obtained in the remarkably short period of 5 minutes and that this amount is not substantially increased by increasing either time of leaching or amount of ammonium sulphide. On the other hand increase in concentration of ammonium sulphide interferes with the settling of the residue from the solution. At 8 cc./liter the solution settles with great difficulty and does not give any clear solution at all in one to two hours. At 5 cc./liter we can get 85 cc. of perfectly clear solution out of 100 cc. leach slurry in five hours.

From the results of the tests described it is concluded that the use of ammonium sulphide as an accelerator has definite advantages which could not have been predicted from the tests with sodium sulphide, that the amount used is highly critical, and that for the ore used in the tests described the amount used should be equivalent to 4.0 to 6.0 milliliters of a solution of colorless ammonium sulphide containing 15% sulphur by weight, per liter of lixiviant.

It will be understood that the amount of ammonium sulphide required to produce the maximum acceleration of the solution of manganous oxide and at the same time provide rapid settling of the residue will vary somewhat with the ore. If, for example, the ore contains copper as an impurity, additional ammonium sulphide will be required to bring about the optimum results. Likewise, if the ore contains a course grained residue so that adsorption on it is reduced to a minimum, the amount of ammonium sulphide will be somewhat reduced.

It has been found that with ores high in iron the reducing of the ore should be carried out so as to bring the iron as far as possible into the state of $Fe_3O_4$. In such ores, however, it has been found desirable to use ammonium polysulphide rather than ammonium sulphide as the accelerator. The optimum amount and sulphur content of the ammonium sulphide accelerator depend on the iron content of the ore and its state of oxidation. It must, therefore, be determined for each ore and roasting condition.

In our previous disclosures of the leaching step we have carried out the process at atmospheric temperature. The effect of temperature outside this range might well be important as well as variations within it. Hence we have studied the effect of temperature on the rate of the leaching step. The results are shown in Table V.

TABLE V

*Effect of temperature on extraction*

[Identical leaches with those described in Table IV were made at varying temperatures, the charge being maintained at the desired temperature by immersing in water while the flask was being agitated on the shaking machine, 4 cc. of ammonium sulphide solution containing 15% sulphur being used in each instance.]

| Temperature, ° C. | Mn content of preg at liquor, g./l. |
|---|---|
| 2 | 32.3 |
| 5 | 34.4 |
| 10 | 42.0 |
| 15 | 42.3 |
| 30 | 39.5 |
| 35 | 37.1 |
| 40 | 38.0 |
| 50 | 37.1 |

Optimum extraction of manganese requires a temperature between 10° C. to 30° C. although the drop in extraction with increasing temperature is not large.

The concentration of ammonia in the leach solution is an important factor in the extraction of manganese. In Table VI is shown the effect of variable ammonia concentration on the concentration of manganese in the leach solution after 45 and 60 minutes agitation, respectively. The two lengths of time are given to show that with ammonia concentrations of 15 to 16 mols per liter there is no precipitation of the dissolved manganese in the additional 15 minutes of agitation whereas at lower concentrations the amount of this precipitation becomes significant.

TABLE VI

*Ammonia as a factor both in pregnant liquor build-up and in stability of high-manganese solutions*

| $NH_3$ concentration, mol/l. | $CO_2$ concentration, mol/l. | $(NH_4)_2S$ concentration, ml./l. | Mn in pregnant liquor, g./l. | |
|---|---|---|---|---|
| | | | 45' | 60' |
| 11 | 2.5 | 2 | 42.3 | 35.1 |
| 12 | 2.5 | 2 | 48.6 | 43.2 |
| 13 | 2.5 | 2 | 55.8 | 54.9 |
| 14 | 2.5 | 2 | 61.2 | 59.4 |
| 15 | 2.5 | 2 | 63.0 | 65.8 |
| 16 | 2.5 | 2 | 63.9 | 63.0 |

All of these tests were run under identical conditions using an amount of ore, ammonium sulphide, and temperature of leaching which had been found to give good extractions for this particular ore. They are, therefore, comparable among themselves but not necessarily with other tests described in this application. In the tests described the upper limit of ammonia concentration has been 16 to 17 mols per liter. This is substantially the maximum concentration which can be obtained at room temperature and atmospheric pressure. As shown in Table VI the amount of manganese which is dissolved still increases a small but definite amount by increasing the ammonia concentration from 14 mols per liter to 16 mols. A still further increase may be obtained by carrying out the extraction under pressure. Under these conditions each additional mol per liter of $NH_3$ which may be dissolved will increase the grams per liter of manganese by about 0.8 of a gram up to a maximum of about 67 grams per liter. This gain is in general not worth the trouble.

The effect of carbon dioxide concentration of the leach liquor on the amount of manganese extracted is also highly important. In our co-pending applications the upper limit of $CO_2$ disclosed was 90 grams per liter. We have now found that improved results are obtained with substantially increased $CO_2$ content, preferred range being from 2.5 to 4.0 mols or at least 110 grams $CO_2$ per liter. Lesser concentrations are workable, but will result in a lower concentration of manganese in the resulting pregnant liquor. This embodiment of our invention is illustrated in Table VII.

TABLE VII

*Effect of $CO_2$ content of lixiviant on the manganese content of pregnant liquors*

| Test No. | $CO_2$, mols/l. | $NH_3$, mols/l. | Mn content of pregnant liquor, g./l. |
|---|---|---|---|
| 1 | 2.00 | 14.7 | 53.1 |
| 2 | 1.75 | 14.7 | 49.5 |
| 3 | 2.65 | 15.0 | 57.6 |
| 4 | 3.24 | 15.0 | 60.4 |
| 5 | 4.00 | 15.0 | 61.8 |

All of these tests were run in an identical manner using an amount of reduced ore, ammonium sulphide, leaching time and temperature which were found to give good extractions on this particular ore. The tests are, therefore, comparable among themselves but not necessarily with other tests given in this application.

In summary then we have found that the leaching step (No. 2) in the process should be carried on in the presence of a critical amount of ammonium sulphide and that the ammonia and $CO_2$ concentrations should be a minimum of 12 mols of $NH_3$ per liter and from 2.5 to 4.0 mols of $CO_2$ per liter. The temperature of the leaching step should be from 10° C. to 30° C. and the time not in excess of one hour. Under these conditions the ratio of ore to leaching solution should be such as to provide a final manganese concentration of from 60 to 85 grams per liter at 90% extraction.

The precipitation step may be carried out as disclosed in our co-pending applications by dilution, by heating or by removing part of the ammonia by evolution. We have found that if it is to be done by heating alone, this is very effectively carried on under pressure, as higher temperatures and therefore shorter times may be used. This is shown in Table VIII.

TABLE VIII

*Pressure precipitation*

[To determine the extent of precipitation of manganese when a pregnant liquor is heated at varying times and temperatures, the liquor being held in heavy, sealed glass bottles.]

| Temp., ° C. | Time | Manganese content, g./l. | Precipitation, percent |
|---|---|---|---|
| 50–53 | 0 | 37.1 | 0 |
|  | 2 hrs | 32.4 | 12.8 |
|  | 4 hrs | 27.4 | 26.2 |
|  | 9½ hrs | 19.4 | 47.7 |
| 76–79 | 0 | 39.0 | 0 |
|  | 55 min | 11.4 | 70.7 |
|  | 1 hr. 55 min | 8.75 | 77.5 |
|  | 5½ hrs | 4.0 | 90.0 |
| 85–95 | 0 | 39.0 | 0 |
|  | 1 hr | 2.1 | 94.6 |

These results were obtained with a solution containing about 12 mols per liter of ammonia.

While pressure precipitation has certain advantages, it has been found that with ammonia above 14 mols per liter precipitation is less complete than at lower concentrations. It has, therefore, been found necessary to reduce the ammonia concentration to about 13 mols before pressure precipitation. It has accordingly been found preferable to accomplish the precipitation by heating at atmospheric pressure. This may be conveniently done at about 65° C. The result of heating a leach solution containing about 52 grams per liter Mn, 3.0 mols per liter $CO_2$ and 16 mols $NH_3$ per liter in this way is shown in Table IX.

TABLE IX

*Atmospheric pressure precipitation of manganese carbonate as a function of $NH_3$ evolution*

| Time | Mn, g./l. | $NH_3$, mols/l. |
|---|---|---|
| 0 | 52.0 | 16.0 |
| 15 | 50.4 | 14.2 |
| 25 | 39.6 | 14.3 |
| 35 | 27.0 | 13.0 |
| 45 | 14.4 | 13.1 |
| 55 | 6.3 | 12.0 |
| 65 | 1.8 | 11.9 |

Some carbon dioxide as well as ammonia is evolved in heating the solution at atmospheric pressure.

We have found that in the precipitation step it is necessary to maintain the molar ratio of $CO_2$ to manganese in solution above a definite value or the manganese carbonate precipitate will be less stable in air and also less filtrable. This ratio has been determined to be 1.75. In the preferred form of the present invention a considerably larger ratio will always be present at the end of the leach period. Ordinarily the ratio will not fall below the minimum during the precipitation step. However, we have found that the precipitation step may be accelerated by maintaining the $CO_2$ concentration or even increasing it during precipitation by adding $CO_2$ before or during the precipitation step. This has a number of advantages. It obviates the necessity of adding $CO_2$ to regenerate the solution after separation of the manganese carbonate, the passage of $CO_2$ into the hot solution hastens the removal of ammonia and any $CO_2$ passing through the solution may conveniently be absorbed in absorption towers provided for the ammonia, thus preventing loss, and finally since $CO_2$ is most readily available in hot combustion gases, these may be used to heat the solution, drive off the ammonia and, at the same time, supply $CO_2$ so that both precipitation and regeneration are effected in the one step.

From a consideration of Table IX it will be seen that 96.5% of the manganese is precipitated at 11.9 mols per liter of ammonia, so that the ammonia concentration of the solution is reduced by only about 25%. There is also, of course, some reduction in the volume of the solution. An actual ammonia balance has shown that approximately 40% of the ammonia originally present in the leach solution is evolved during the precipitation step.

In another embodiment of our invention the solution is treated with carbon dioxide before heating for the removal of ammonia. This may be conveniently accomplished by using combustion gases containing $CO_2$ to heat the solution for the precipitation step and then using the thus cooled $CO_2$ containing gas to carbonate the next batch of solution.

In summary, then, the precipitation step (No. 4) of our invention is preferably carried out by heating the solution at atmospheric pressure whereby the ammonia concentration of the solution is reduced by about 25%, usually from about 16 mols per liter to 12 mols per liter, the carbon dioxide content of the solution being maintained above 1.75 mols per liter. In this way the manganese content of the solution may be reduced to less than 7.0 grams per liter. The regeneration of the solution step (No. 6) is preferably carried out in two parts, the addition of $CO_2$ to make up for that to be taken out of the solution as manganese carbonate being made ahead of the precipitation step or concurrently with it. This is done relatively cold if in advance of the precipitation step, or hot if concurrent with it, and may be expedited by carrying out the carbonation under pressure. In the second part the ammonia evolved in the precipitation step is at least in part absorbed in the barren liquor from the precipitation step after cooling.

Having now described the effect of various factors on the novel steps of our invention and indicated the basis for the improvements which we have made therein and which we wish to protect by letters patent based on the disclosures of of the present application we will now describe the practical application of the process.

A diagrammatic representation of one preferred form of the process is shown in the figure. In this flowsheet:

Step (1) represents the reduction of the higher manganese oxide content of the ore to MnO, or in the case of a carbonate ore, the conversion of the $MnCO_3$ content to MnO by heating. This step is effected by heating to a suitable temperature in a reducing atmosphere, such as hydrogen, natural gas, producer gas, or with sufficient solid fuel or liquid hydrocarbons to maintain such a reducing atmosphere. It may be performed in rotary kilns, multihearth furnaces, shaft furnaces, tunnel kilns or in a variety of other conventional or specially designed pieces of heating equipment.

Step (2) represents the cooling of the reduced ore to avoid the re-oxidation that would occur if the hot ore were exposed to the atmosphere. It may be effected by a device such as the Baker cooler, in which the reduced material, under a protective atmosphere, is advanced through a rotating, water-cooled cylinder, or by quenching in water, or by other conventional methods.

Step (3) is the leaching step, in which the manganese is extracted through contact with solution made from $NH_3$ and $CO_2$ containing some accelerating agent such as ammonium sulphide. This step has been very effectively carried on in closed tanks, agitated by a motor-driven propeller. It lends itself well to a great variety of other conventional equipment and methods, including percolation leaching, and in addition, because of the relatively short leaching period required, continuous leaching equipment such as rotating cylinders with internal baffles to limit short-circuiting may be used. This leaching step may be carried on in cast iron or steel equipment without the equipment being attached or the solution contaminated. This fact is one of the important advantages of the process as such equipment is inexpensive and readily fabricated in any desired form.

Step (4) is a residue separation step which yields clear pregnant liquor and tailings. Various types of filters may be used in this step, though pressure filters are preferred because of the presence in the solution of volatile ammonia. Excellent results are also obtainable from thickeners, however, and any of the large number of conventional pieces of equipment of this type may be used. However, tray-type thickeners are considered particularly desirable for this step because they may be completely closed off to prevent loss of the volatile ammonia. Centrifuges of various types may be used.

Step (5) is the carbonation of the pregnant liquor from step (4). This is effected by means of the cooled, oxygen-free kiln gases from the reduction step. It may be carried on in tanks using special absorption equipment such as the Turbo-Absorber, in standard absorption towers, by dispersing the gases into a stream of fine bubbles by passing through porous Alundum or fritted glass dispersers, or in other conventional gas-absorption equipment. The carbonation step may also be carried out under considerable pressure.

Step (6) consists of the precipitation of $MnCO_3$ from the solution. In one embodiment of the process, steps (5) and (6) are combined, the carbonation of the pregnant liquor being carried out with kiln gas, that is, hot enough to drive off the required amount of ammonia and to heat the solution to a temperature of around 65° C. where complete precipitation can be obtained. Under such conditions, the equipment used would be that described under step (5). Where the steps are carried on separately, however, any conventional type of heat exchanger would be suitable. The equipment for the precipitation step may be made of iron or steel but where a high purity of product is required the steel is preferably coated with a vitreous enamel. Stainless steel containing about 20% Cr, 12% Ni and 2% Mo may be used without surface protection and will not be attacked or contaminate the solution.

Step (7) is a separation of the precipitated $MnCO_3$ from the barren liquor. Any type of vacuum or pressure filter would be suitable, preferably the latter because of the presence of volatile ammonia. Thickeners, however, are to be preferred since the $MnCO_3$ settles very rapidly, and the enclosed tray thickeners are very suitable.

Steps (8) and (9) consist of the washing of the $MnCO_3$ product to free it of ammonia and ammonium carbonate. The first wash is an ammonia wash to recover as much manganese as possible. The final washing is done with water, this last being sent to the ammonia boiler for ammonia recovery. These are standard chemical engineering steps involving standard equipment, such as tray-type counter-current decantation thickeners, washing filters, etc. All such equipment may be constructed of cast iron or steel.

Step (10) is the final treatment of the product before shipment. It requires some control to minimize oxidation, and temperatures should be kept below 150° C. Where a particularly light-colored product is desired, vacuum dryers should be used; otherwise conventional drum, tube and shelf dryers are satisfactory.

Steps (11) and (12) are the washing of the leach tailings for recovery of the mother liquor. The first wash must be made with ammonia water, since addition of water to the tailing would precipitate the manganese in the mother liquor through dilution. The final washing is done with water to recover the ammonia content of the liquor which had displaced the mother liquor. The washing may be done by use of washing filters, but is preferably effected by thickening, the enclosed tray-type thickeners being particularly suitable. The manganese-bearing liquor from the ammonia washing step (11) may be alternatively added to the pregnant liquor in the carbonation step (5) or sent to the ammonia absorber with the barren liquor from step (7) as shown in the figure. Which of these alternatives is adapted will depend on the amount of residue and the ease with which it is washed. With a small amount of easily washed residue the second alternative as in Example IV will be adopted; however, with a low grade ore and a consequently large amount of residue a counter-current washing method will be adopted and the liquor relatively high in manganese content will be added to the pregnant liquor in the carbonation step. This is illustrated in Example I.

Step (13) is an ammonia-recovery step in the process in which the various wash waters obtained from the treatment of tailings and product are collected and heated to recover ammonia. Almost any standard heating or evaporating equipment is suitable for this purpose.

Step (14) is the cooling step designed for adjusting the temperature of the kiln gases to the desired value. Standard gas heating and cooling equipment would be satisfactory for such purposes.

Step (15) provides oxygen-free kiln gas to the system for make-up $CO_2$. It consists simply of a bed of glowing coke through which the kiln gases are passed to complete their reduction.

Steps (16) and (17) consist of ammonia and ammonia-$CO_2$ absorption towers. These are standard, packed towers, as used throughout the chemical engineering industry.

Step (18) consists of condensation of the water from the gases evolved in the precipitation operation.

Several examples will now be given of the application of the process to specific ores.

EXAMPLE I

For this example we take a manganese dioxide ore from the Appalachian region of the United States having the composition:

| | |
|---|---|
| Manganese | 27.4 |
| CuO | .54 |
| MgO | .64 |
| Iron | 6.18 |
| $SiO_2$ | 29.95 |
| $Al_2O_3$ | 4.72 |
| BaO | 1.15 |

We reduce this ore in a stream of producer gas saturated with water at 600° C. (1112° F.). The reduction is carried out in an externally heated alloy tube through which the reducing gas is passed.

The leaching of this ore is carried out in batches of 2000 pounds each in steel tanks provided with motor driven agitators and gas tight covers connected to an ammonia absorption system. For the leaching a solution containing 3.5 mols of $CO_2$ per liter and 16.0 mols of $NH_3$ per liter is used. For each batch we use about 850 gallons of such solution. As an accelerator we add 10 pounds of ammonium sulphide to each batch. About 500 pounds of manganese is extracted to produce a solution containing about 70 grams of manganese per liter. The temperature rise is only 3° C. above room temperature and the loss of ammonia is insignificant. The time to leach each batch is 20 minutes. The slurry is thickened and 60% of the manganese removed in 510 gallons of clear solution. The thickened residue is washed with an aqueous solution of ammonia and $CO_2$ containing 12 mols per liter of $NH_3$ and 3.5 mols of $CO_2$ per liter in a series of five 1000 gallon tanks, the ammonia and $CO_2$ solution passing countercurrent to the pulp. The manganese content of the solution as it leaves each of the five thickeners is as follows:

| Thickeners: | g./liter |
|---|---|
| 1 | 50.0 |
| 2 | 32.0 |
| 3 | 18.0 |
| 4 | 6.0 |
| 5 | 1.0 |

The total solution recovered from the thickeners is accordingly 600 gallons containing 34 grams per liter and 510 gallons containing 70 grams per liter, that is, a total 1,110 gallons containing about 495 pounds of manganese.

The residue is washed in a similar series of counter-current thickeners to recover the ammonia which is boiled off the wash water for re-use in the system.

The solution is ready for the carbonation and precipitation step. Since this solution contains about 50 grams per liter of manganese, about 3.5 mols per liter of $CO_2$ and 14 mols per liter of $NH_3$, it is carbonated by the addition of 360 pounds of $CO_2$ to provide for the $CO_2$ to be removed as $MnCO_3$ in the precipitation step. It is then heated in a tank provided with a stirrer and connected to the ammonia absorption system to 65° C. for three hours, whereby the ammonia concentration is reduced to 11.5 mols per liter and about 1000 pounds of manganese carbonate precipitated in a readily filtrable form. The manganese carbonate is filtered on a washing filter from the solution which then contains about 5.0 grams per liter of manganese, 11.5 mols per liter of $NH_3$ and 3.5 mols per liter of $CO_2$. This solution is cooled and used for the absorption of the ammonia and $CO_2$ liberated at various points in the process.

The filtered manganese carbonate is washed with a solution containing 12 mols of $NH_3$ per liter and 3.5 mols of $CO_2$ per liter to remove manganese down to 0.10 gram per liter and the wash solution used along with the barren solution from the precipitation step for the absorption of ammonia and $CO_2$. The carbonate is then washed with water which is boiled for the recovery of ammonia and $CO_2$. Some of the ammonia and $CO_2$ evolved at various points in the system is absorbed in water rather than barren or wash solution to provide the manganese free wash water for residue and carbonate. The water balance in the system is provided by adjusting the amount discarded in the wash water boiler and the amount used in the absorber for making the manganese-free wash water.

The manganese carbonate recovered in this way is a light pink color and is stable in air and when dried at 110° C., it analyzes as follows:

|  | Percent |
|---|---|
| Mn | 44.2 |
| $CO_2$ | 35.2 |
| $H_2O$ | 7.2 |
| Fe | .08 |
| Alkali metals | .03 |

Other impurities are present as traces only. This manganese carbonate is of such grain size that it oxidizes at 570° F. in 10 hours to a product analyzing at least 75% $MnO_2$ and this product responds to further improvement in accordance with the process of a co-pending application of one of us, Serial No. 65,540, filed December 15, 1948, for Active Form of Manganese Dioxide and Process for Preparing It. The process therein disclosed provides for the further oxidation of the manganese oxide by recarbonation with $CO_2$ in a water slurry and further oxidation by drying and heating again at 570° F.

EXAMPLE II

In this example we take 100 pounds of manganese concentrates from Chamberlain, South Dakota, analyzing:

|  | Percent |
|---|---|
| Mn | 17.3 |
| Ca | 8.07 |
| Mg | 1.54 |
| $P_2O_5$ | 1.56 |
| Fe | 12.72 |
| $Al_2O_3$ | 2.92 |
| $SiO_2$ | 11.92 |
| $CO_2$ | 23.55 |

We heat this ore in a closed crucible containing only a little charcoal at 800° C. in order to drive off the $CO_2$ and obtain the manganese in the form of MnO together with oxides of iron, calcium and magnesium and the other constituents of the original ore.

We carry out the solution step of our process on this ore by adding the finely ground roasted ore to a solution containing 14.0 mols per liter of $NH_3$ and 4.0 mols per liter of $CO_2$ to which $CO_2$ is being added so as to maintain the $CO_2$ content at all times above 3.5 mols per liter. The amount of $CO_2$ which must be added is that which will combine with the lime and magnesia and iron present. The 100 pounds of ground ore is added to 30 gallons of solution which contains one pound of ammonium sulphide, the solution and ore being agitated during the period of addition. The resulting solution contains about 60 grams per liter of manganese and represents an extraction of 87% of the manganese from the ore.

The solution is allowed to stand several hours whereby any lime or magnesia which is dissolved is precipitated. The residue is then separated from the solution by pressure filtration. The residue is washed with a solution containing 16 mols per liter of ammonia to remove manganese and this wash solution used together with the barren solution from the precipitation step for the preparation of leaching solution for processing additional roasted ore. The residue relatively free from manganese is heated to drive off ammonia and $CO_2$ which is absorbed for re-use.

The pregnant solution containing about 12 pounds of manganese in 24 gallons of solution is heated to 90° C. for 20 minutes in a sealed iron tank lined with a plastic coating. Ninety-six percent of the manganese is precipitated as carbonate. The carbonate is filtered and the barren solution is used for making the next batch of lixiviant. The carbonate precipitated in this way is so readily filtrable and the manganese is reduced to so low a value in the solution that the carbonate is pressed as dry as possible on the filter and the washings discarded.

The carbonate obtained in this way analyzes:

|  | Percent |
|---|---|
| Mn | 44.2 |
| $CO_2$ | 35.6 |
| $H_2O$ | 7.5 |
| Fe | .10 |
| CaO | .20 |
| MgO | .08 |

The carbonate is stable in air and may be dried at 110° C. without discoloration.

EXAMPLE III

The cyclic nature of our process is illustrated by the following example in which an African ore having the following analysis was used:

|  | Percent |
|---|---|
| Mn | 48.92 |
| Fe | 4.10 |
| Si | 11.24 |
| P | .18 |
| CaO | .26 |

This ore was reduced prior to leaching by heating to 750° C. with anthracite coal. In this example the same lixiviant was used in 15 cycles of operation, being regenerated after the precipitation step by the addition of $CO_2$ and $NH_3$ to bring it to the original concentration of these constituents.

The procedure for separating and washing the residue and for washing the precipitate were the same as in Example I. No attempt was made in these tests, however, to recover and use $NH_3$ and $CO_2$ cyclically. The precipitation step was carried on by heating in enamelled iron vessels until the ammonia content had been reduced to 11 mols per liter. The leaching step was carried on in an ordinary steel tank. In each cycle 2500 grams of reduced ore were used together with 19 liters of solution containing 265 grams of $NH_3$ per liter, 125 grams of $CO_2$ per liter, 1.8 grams of manganese per liter and 1.0 gram of $(NH_4)_2S$ per liter. The build up of iron, alkali metals and second group metals, that is, those precipitated by $H_2S$ in a slightly acid solution in the carbonate was determined.

| Cycle No. | Extraction, percent Mn | Fe, percent | Alkalis, percent | S, percent | Second group, percent |
|---|---|---|---|---|---|
| 1 | 93.0 | 0.13 | 0.03 | 0.01 | Trace. |
| 2 | 92.5 | .12 | .03 | .02 | Do. |
| 3 | 89.6 | .12 | .03 | .01 | Do. |
| 4 | 90.2 | .13 | .03 | .02 | Do. |
| 5 | 86.1 | .12 | .03 | .01 | Do. |
| 6 | 87.6 | .13 | .03 | .03 | Do. |
| 7 | 90.1 | .12 | .03 | .01 | Do. |
| 8 | 91.2 | .12 | .03 | .01 | Do. |
| 9 | 93.2 | .12 | .03 | .04 | Do. |
| 10 | 94.1 | .12 | .03 | .02 | Do. |
| 11 | 92.0 | .12 | .03 | .01 | Do. |
| 12 | 91.8 | .12 | .03 | .02 | Do. |
| 13 | 89.7 | .12 | .03 | .01 | Do. |
| 14 | 88.0 | .12 | .03 | .01 | Do. |
| 15 | 93.8 | .12 | .03 | .02 | Do. |

It will be seen that the impurities in the product remain constant indicating that the impurities taken into the leach step are held to a constant concentration. This is an unusual and very desirable characteristic of a cyclic process.

EXAMPLE IV

We take a relatively high grade ore having a coarse siliceous gangue and subject it to a reducing roast in a muffled hearth furnace using oil as the reducing agent. The ore analyzed:

| | Percent |
|---|---|
| Mn | 51.0 |
| Fe | 5.6 |
| $SiO_2$ | 12.2 |

One thousand pounds of the reduced ore was extracted with 1000 gallons of a solution containing 17.0 mols of $NH_3$ per liter and 3.5 mols of $CO_2$ per liter. To the entire batch was added one pound of ammonium sulphide. Leaching was carried out in a steel tank with agitation and required 15 minutes for each batch. The residue was sandy and easily settled, filtered, and washed. The total weight of residue was 210 pounds. The residue was separated on a washing filter and the recovered solution had a volume of 950 gallons and contained 95% of the manganese. The residue was washed with four 50 gallon portions of ammonia solution containing 12 mols per liter of $NH_3$. The resulting residue contained less than 0.2% of the total manganese. The recovered solution was heated to precipitate $MnCO_3$ and drive off 40% of the ammonia and 25% of the water. The gases were passed through a condenser and absorber to recover about 380 gallons of ammonia solution containing about 12 mols per liter of $NH_3$.

One thousand one hundred twenty pounds of hydrated $MnCO_3$ was separated from the barren solution and the latter used to absorb ammonia and $CO_2$ evolved in other steps of the process and to absorb make-up $CO_2$ and was thereby regenerated for use in the leaching step of the process. The $MnCO_3$ was washed with three 60 gallon batches of ammonia solution containing 12 mols per liter of $NH_3$. The soluble manganese in the $MnCO_3$ was thereby reduced to an insignificant amont. The ammonia wash solution for the residue and $MnCO_3$ wash were obtained from the condenser and the wash solutions from these operations mixed with the barren solution from the precipitation step to absorb ammonia liberated in other steps of the process. The residue and $MnCO_3$ after being washed with the ammonia solution are washed with water and the wash water boiled to evolve $NH_3$ and $CO_2$ which is collected in the ammonia absorber. No water is added to the system by this operation.

The advantages of the process of our invention over our earlier disclosures as well as over processes previously known in the art will be obvious from the data and examples which we have given. In summary, however, it is pointed out that the process of the present invention provides the following advantages:

(1) More rapid solution of the manganese oxide from the roasted ore.

(2) Higher concentration of manganese in the pregnant solution.

(3) More complete precipitation of manganese in the precipitation step.

(4) Manganese carbonate product pure and readily filtrable.

(5) Completely cyclic process without build up of impurities.

(6) Economy of heat since no solution need be heated above 65° C. and no water is evaporated except as incidental to the precipitation operation and the boiling off of some ammonia and $CO_2$.

(7) Since all solutions are ammoniacal, steel equipment can be used.

(8) The only chemical actually consumed in the process is $CO_2$ which can be supplied in the form of combustion gases, the heat of which is also utilized.

What is claimed is:

1. Process of recovering manganese as manganese carbonate from a material containing manganese in the form of MnO, which comprises extracting the material with an aqueous solution containing at least 140 g./l. of $NH_3$ and at least 38.5 g./l. of $CO_2$, in the presence of an added agent selected from the group consisting of hydroxylamine salts, ferrous salts and soluble sulphides in an amount from 0.1% to 3.0% of the weight of the manganese-containing material.

2. Process defined in claim 1, in which the reducing agent is a hydroxylamine salt.

3. Process defined in claim 1, in which the reducing agent is a ferrous salt.

4. Process defined in claim 1, in which the reducing agent is a soluble sulphide.

5. Process defined in claim 1, in which the reducing agent is ammonium sulphide $(NH_4)_2S$.

6. Process of recovering manganese as manganese carbonate from ore containing manganese in the form of MnO which comprises extracting the ore with an aqueous solution containing at least 140 g./l. of $NH_3$ and at least 38.5 g./l. of $CO_2$, in the presence of an added agent selected from the group consisting of hydroxylamine salts, ferrous salts and soluble sulphides in an amount from 0.1% to 3.0% of the weight of the ore, at a temperature between 10° and 30° C., separating the resulting manganese-containing solution from undissolved residue, adding $CO_2$ to the solution in an amount at least approximately equal to the manganese present, reducing the ammonia concentration of the solution to less than 12 mols per liter, heating the solution to at least 60° C. for at least 30 minutes whereby to precipitate at least 90% of the contained manganese as manganous carbonate, separating the precipitated manganous carbonate from the solution, adding ammonia to the solution to raise its ammonia concentration to at least 140 g./l., and reusing the solution in a repetition of the first step.

REGINALD S. DEAN.
ABRAHAM L. FOX.

REFERENCES CITED

The following references are of record in the file of this patent:

J. W. Mellor's "Modern Inorganic Chemistry," Single Vol. Ed., January 1935 reprint of Eighth Edition, page 657, Longmans, Green & Co., N. Y.